US007466986B2

(12) United States Patent
Halcrow et al.

(10) Patent No.: US 7,466,986 B2
(45) Date of Patent: Dec. 16, 2008

(54) ON-DEVICE MAPPING OF WIFI HOTSPOTS VIA DIRECT CONNECTION OF WIFI-ENABLED AND GPS-ENABLED MOBILE DEVICES

(75) Inventors: Michael Austin Halcrow, Pflugerville, TX (US); Dustin Kirkland, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 11/335,894

(22) Filed: Jan. 19, 2006

(65) Prior Publication Data
US 2007/0167174 A1   Jul. 19, 2007

(51) Int. Cl.
*H04Q 7/20* (2006.01)
(52) U.S. Cl. ........... 455/456.2; 455/456.1; 701/207; 702/188; 709/228
(58) Field of Classification Search ............. 455/456.1, 455/456.2; 701/207; 702/188; 709/228
See application file for complete search history.

(56) References Cited

U.S. PATENT DOCUMENTS

| 5,781,536 | A | 7/1998 | Ahmadi et al. | |
|---|---|---|---|---|
| 5,870,385 | A | 2/1999 | Ahmadi et al. | |
| 6,597,671 | B1 | 7/2003 | Ahamdi et al. | |
| 6,813,501 | B2 * | 11/2004 | Kinnunen et al. | 455/456.2 |
| 6,823,284 | B2 | 11/2004 | Gfeller et al. | |
| 2002/0055817 | A1 * | 5/2002 | Chou | 701/207 |
| 2002/0077787 | A1 * | 6/2002 | Rappaport et al. | 702/188 |
| 2003/0212800 | A1 * | 11/2003 | Jones et al. | 709/228 |
| 2004/0072581 | A1 | 4/2004 | Kabushiki et al. | |
| 2004/0106379 | A1 | 6/2004 | Zen | |
| 2006/0121914 | A1 * | 6/2006 | Kim et al. | 455/456.1 |

FOREIGN PATENT DOCUMENTS

EP   1398914 A2   3/2004
WO   2004052041 A   6/2004

OTHER PUBLICATIONS

IBM Corporation, PCT/EP2007/050498, International Search Report and Written Opinion, Jun. 14, 2007, 12 pgs.

* cited by examiner

*Primary Examiner*—Charles N Appiah
*Assistant Examiner*—Michael T Vu
(74) *Attorney, Agent, or Firm*—Dillon & Yudell LLP

(57) ABSTRACT

A WIFI-enabled and GPS-enabled user device executes a hotspot location utility, which enables the device to detect WIFI hotspots and update a locally-stored hotspot location database (LHLD) containing geographically-mapped hotspots. When a hotspot is detected, the device accesses the hotspot, retrieves identification information and usage terms from the hotspot, and measures performance metrics of the hotspot. The utility stores the identified hotspot with the current GPS coordinate as an entry within the LHLD. When a user later desires to locate hotspots within a particular geographic location, the user enters the physical address of the location, and hotspots with matching (or proximate) GPS coordinates of the entered address are presented to the user. The user may specify certain preferences for usage terms, performance metrics, and location criteria, and the utility filters all geographic hits and returns only hotspots in the geographic location that also satisfy these preferences.

1 Claim, 13 Drawing Sheets

| ENTRY NUMBER | NAME | GPS COORD. | DATE | 1ST DATE | CONNECTION SPEED | DOWNLOAD SPEED | % UPTIME | DOWNTIME | RELIABILITY | CAST | LOGIN | ... |
|---|---|---|---|---|---|---|---|---|---|---|---|---|
| 1 | M-MOBILE | 137.2, 256.9 | - | - | 11 MBPS | 5 MBPS | 95% | 11:00PM -3:00PM | 90% | FREE | FREEWI | - |
| ... | ... | | | | ... | | ... | | ... | | | ... |

FIG. 7

ON-DEVICE MAPPING OF WIFI HOTSPOTS VIA DIRECT CONNECTION OF WIFI-ENABLED AND GPS-ENABLED MOBILE DEVICES

RELATED APPLICATIONS

The present application is related to the subject matter of commonly-assigned, co-pending application, Ser. No. 11/355,444 titled "GENERATING AND DYNAMICALLY UPDATING DATABASES OF WIFI HOTSPOTS LOCATIONS AND PERFORMANCE METRICS VIA LOCATION MAPPERS," filed concurrently herewith. The entire content of the related application is incorporated herein by reference.

BACKGROUND OF THE INVENTION

1. Technical Field

The present invention relates generally to computer networks and in particular to wireless access to computer networks. Still more particularly, the present invention relates to a method, system/device and computer program product for providing up-to-date location of hotspots for wirelessly accessing computer networks.

2. Description of the Related Art

The implementation and utilization of wireless computer networks are growing at a tremendous rate as computer (and other device) users become more and more mobile. Wireless fidelity (WIFI) networks, in particular, have seen a surge in consumer use and have become the most widely utilized standard for wireless networking. WIFI networks operate according to Institute of Electrical and Electronic Engineers (IEEE) 802.11 standard, which is supported by most hardware vendors. These WIFI networks typically have an indoor range of one hundred and fifty to three hundred feet, with performance likely to degrade as the distance increases. Also, typical outdoor ranges for these WIFI networks are approximately one thousand feet. The strength and performance of the outdoor WIFI network typically also degrade as the distance increases, depending also on a number of factors such as atmosphere conditions and physical obstructions.

In order to provide distributed wireless access to a network, network service providers typically provide a plurality of geographically-dispersed wireless access ports. These wireless access ports provide WIFI access points that allow computer users to access the Internet via laptop and/or hand-held (or portable) computers/devices, such as personal digital assistants (PDAs), smart phones, cellular phones, and the like. These WIFI access points are referred to as "hotspots" and are currently located in many airports, hotels, restaurants, coffee shops and convention centers, for example.

Particularly, the term hotspot refers to the area extending from the wireless access port within which the wireless signal is broadcasted and can be detected by a wireless-enabled/capable user device. "Hotspot" based wireless services are provided by adhoc networks using short-range wireless systems, such as Bluetooth, 802.11 and wireless local area network (WLAN) technology/protocol and provide proximity-based wireless services to mobile terminals at the associated "hotspots." The short range wireless systems are provided via a hotspot access point/port or hotspot server. Each working wireless access port thus emits a wireless signal recognized by wireless-capable mobile devices. The mobile devices then latch onto the wireless signals and are able to access the network via a series of authentication procedures with the background network, depending on whether the network is openly available (or free) or requires some form of payment or subscription.

As WIFI use continues to expand, many of the major notebook computer manufacturers (and manufacturers of other mobile devices) manufacture their devices with an embedded wireless network interface card (NIC) or the mechanism for attaching such a device post-manufacture (e.g., as a USB device). The users of these devices may then access the mobile functionality provided by the computer by subscribing to one or more of the available wireless networks and/or relying on the availability of free-use hotspot locations. However, such wireless access may then require the user have some knowledge of the location of the available wireless networks in their geographic vicinity.

One problem associated with current access to WIFI hotspots is that it is sometimes difficult for a user to locate a WIFI hotspot in a nearby geographic location. While the mobile user may be able to occasionally pick up a random wireless signal, the majority of users prefer to have some idea of where the hotspots are located so that they do not have to drive around town, searching for a wireless signal (from a particular service provider to which the user subscribes) or some random signal at a previously unknown (though publicly-available) location. Thus wireless users tend to congregate at known hotspots that are advertised in some way. For example, certain popular retailers (e.g., Starbucks and McDonald's) and other establishments install hotspots in their locations to draw patrons. However, people new to the area or unfamiliar with the area may not know where these establishments are located. Travelers to a new location fall into this category of users. In addition, not all hotspots have the same performance or cost characteristics. Some hotspots may have a contract with a certain provider through which the user subscribes, or the hotspot may employ a pay-on-demand type service. In these cases, the user may want to know what the rates and/or contract conditions are for the service, possibly filtering the query results according to those parameters.

A practice termed "warchalking" has been emerging. Warchalking entails drawing a chalk symbol on a wall or pavement to indicate the presence of a wireless networking node. When a computer user comes across this symbol, the symbol notifies the user that the location contains a WIFI hotspot. Warchalking is, however, not a complete nor reliable system because the system is based on an ad-hoc process of the public discovering wireless fidelity nodes, whether commercial or not, and manually signaling the presence of the hotspot with chalk symbols. Also, warchalking does not eliminate the frustration of having to drive around with the hopes of finding a hotspot, particularly since most hotspot locations do not ascribe to the warchalking concept. In addition, the user may not have the time to search for warchalking symbols to find hotspot locations and may not want to risk the possibility of confidential business data being transferred across networks with unknown security features.

Because of the frustration and uncertainty in the above methods of finding hotpost locations, many online websites have began publishing the location of hotspots in particular geographic areas. Directories of hotspot locations are thus available to the user on the Internet. Thus, astute users typically access a website providing a list of available local hotspots and their corresponding street address. The user then determines where these hotspots are relative to their current location and picks one that is convenient (close by) or belongs to the service provider to which the user subscribes.

Current practices for using the Internet to track and find WIFI hotspots, such as 802.11 Access Points, are cumbersome and inefficient. Lists are frequently generated by word-of-mouth, for example, the list maintained on the Austin, Tex.' Wireless Group's world-wide web (www) site: "austin-wireless.net/cgi-bin/index.cgi/NodesAroundAustin." Hotspots on these lists regularly go down for long periods of time, but the lists do not reflect these extended outages since the list is not updated unless a user becomes aware of the outage and takes the time to make a manual report to the administrator of the list. Added to the unreliability of the list is the fact that these lists provide little or no information regarding the overall quality of the connections, the bandwidth, availability, or other such statistics.

Despite this online information, a wireless mobility user may have difficulty finding a hotspot location for wireless access. Subscription users may not have brought a hard copy listing of the carrier-provided WIFI hotspot locations. Even when the locations are known, there is no guarantee that the wireless signal is still operational.

Particular web sites such as JiWire® (jiwire.com) provide a searchable database of WIFI hotspots. However, JiWire's database suffers from many of the same drawbacks as above. Also, the JiWire results are heavily biased toward T-Mobile® and Boingo® hotspots, which require either a payment or a subscription to use. This bias towards paid hotspots indicates that JiWire populates its database largely with hotspots reported to it by T-Mobile or Boingo, while other hotspots of competitors or ones that may be free are not as readily added to the JiWire database since JiWire receives no financial incentive for listing these cites. As with the Austin, Tex. website, JiWire is also manually updated and thus subject to the similar limitations described above.

SUMMARY OF THE INVENTION

Disclosed are a device, a method, and a computer program product for efficiently generating a substantially accurate list of available hotspots in geographic locations on a user's WIFI-enabled device. A WIFI-enable and GPS-enabled user device is programmed with a hotspot location utility, which enables the user device to detect WIFI hotspots and dynamically update a locally-stored database of geographically-mapped hotspots using current GPS coordinates. The hotspot location database (HLD) includes an identification of detected hotspots that are currently operating and available for wireless access. Along with each identified hotspot is information related to specific operating parameters/performance metrics of the hotspot as well as its GPS (global positional signal).

When a hotspot is detected, the utility triggers the user device to access the hotspot and retrieves information about the particular hotspot, including the name and performance metrics, such as quality of service (QoS) and connection speed. The utility then obtains the current GPS location and associates the identified hotspot with the current GPS coordinate. Then, the utility stores the hotspot ID and parameters along with the current GPS coordinate as an entry within the HLD.

When the user later desires to locate hotpots within a particular geographic location, the user opens a GUI of the utility on his device and enters the physical address of the location. The physical address is converted to its GPS coordinate and the GPS coordinate matched against the GPS coordinates associated with hotspots stored within the database. Corresponding hotspots are then presented to the user. However, when the user specifies within the request certain preferences for performance metrics and location criteria desired, the utility filters all geographic hits and returns only hotspots in the geographic location that also satisfies these preferences. Hotspots that are identified as meeting the desired criteria are displayed within the output to the user. In addition to the street address, the presented information may include distance from the user's current location, driving/walking directions (from the user's current GPS location), and/or a map of the location.

The above as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 7 is an example of an HLD with a single entry depicted according to one embodiment of the invention.

DETAILED DESCRIPTION OF AN ILLUSTRATIVE EMBODIMENT

Figure 1:
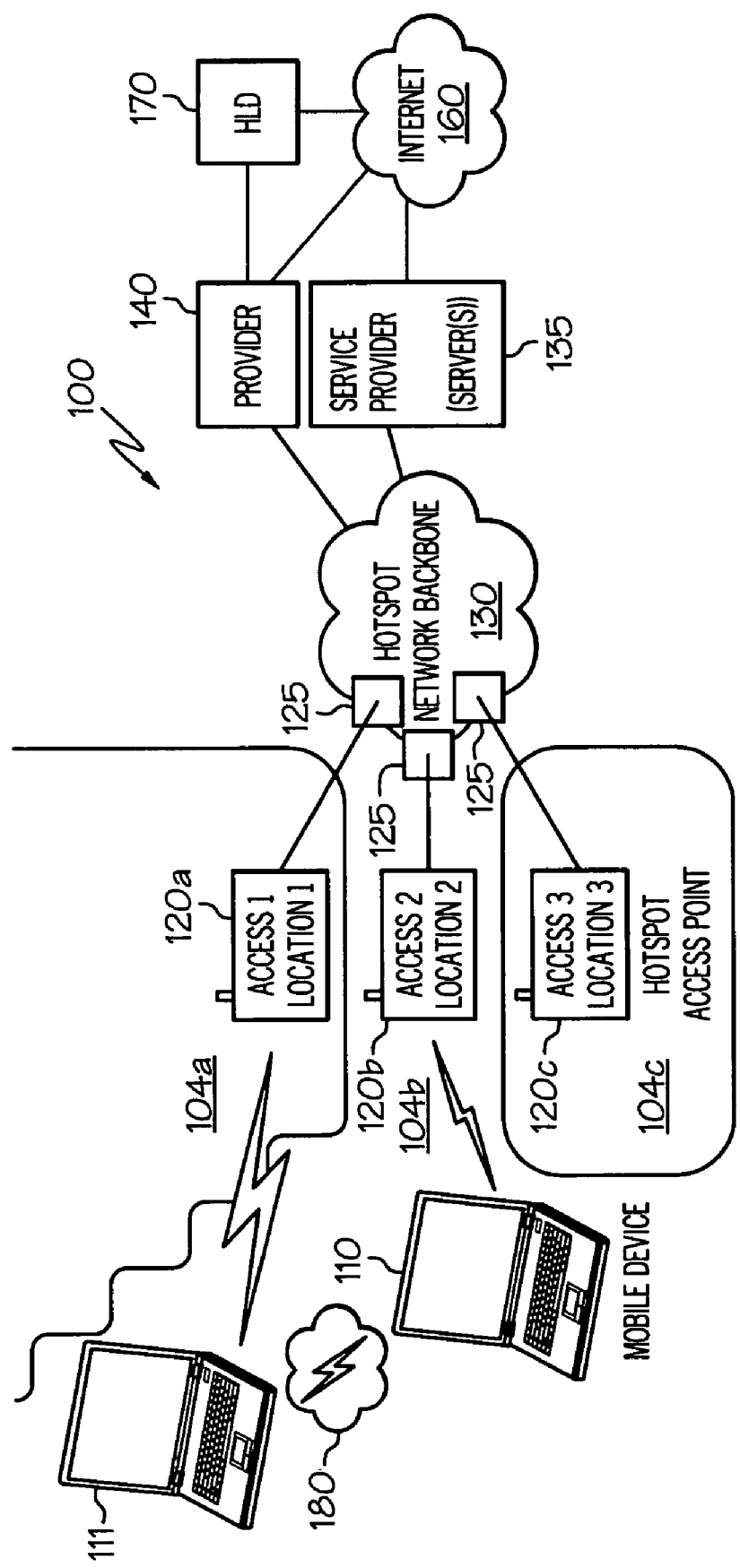
FIG. 1 illustrates a computer network having a Provider, multiple geographically dispersed hotspots and one of more enhanced mobile devices that together support the various features of the invention.

The present invention provides a method, system/device, and computer program product for efficiently generating a substantially accurate list of available hotspots in geographic locations. Two different implementations of the invention are provided, described below in delineated Sections I and II. The first implementation, which is described in Section I below, involves updates to a server-level (centralized) Provider that maintains up-to-date WIFI hotspot information with the aid of a plurality of mappers. The second implementation, which is described in Section II below, involves individual user-devices programmed with a WIFI locator utility that initiates frequent updates of a locally-stored WIFI locator database with up-to-date WIFI hotspot information.

Within the descriptions of the figures, similar elements are provided similar names and reference numerals throughout the figure(s). Where a later-described figure utilizes an element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

Also, while the two implementations are primarily delineated within respective sections, processes relevant to both implementations may be described only within Section I or may be similarly described within both sections. Parallel processes within both implementations may only be described in details within Section I. The division of the invention among Sections I and II are not meant to imply any limitations from one section to the other, but rather to enable continuity with the overall flow of the description SECTION I: Provider Database Updating and Mapping Service In the first implementation, a computer system is configured with a hotspot location utility to enable the computer system to operate as a Provider. The Provider receives from specially programmed mobile devices hotspot operability/availability transmissions (HOTs), which each include an identification of a currently operating and available hotspot as well as operating parameters/performance metrics of the hotspot. The Provider concurrently receives from the mobile device a current GPS (global positional signal) coordinate of the device transmitting the HOT. The Provider then associates the hotspot (or HOT) with the received GPS coordinate, and the Provider stores the HOT and associated GPS coordinate as an entry within a hotspot locator database (HLD) that comprises multiple entries of HOTs and their associated GPS coordinates.

When the Provider later receives a request from a user searching for hotpots within a particular geographic location, the Provider converts the received address (geographic location) into its GPS coordinate and determines which acceptable entries of the multiple entries have a GPS coordinate (and therefore geographic location) within a given range of the particular GPS coordinate (geographic location) received from the requesting user. The Provider then provides an output of the acceptable entries to the user. In addition to the street address, the presented information may include distance from the user's current location, driving/walking directions, and/or a map of the location and performance metrics, such as such as quality of service (QoS) and connection speeds. These metrics are detected from actual connection of a mapping device to the local WIFI-hotspot to retrieve hotspot connection data. In one embodiment, the user is able to specify within the request certain preferences for performance metrics and location criteria desired for the hotspot the user wishes to locate. The Provider may then return only hotspots in the geographic location that satisfies these metrics and criteria.

In another embodiment, the Provider operates an online hotspot locating service that requests users sign up as hotspot location mappers. As a mapper, the user utilizes his/her mobile device, which is wireless-enabled and GPS-enabled to detect hotspots. When a hotspot is detected by the user's device, the device transmits the HOT including and/or along with the device's GPS coordinate. In this manner, current and substantially accurate hotspot location information is received by the Provider to update a database of available hotspots.

Referring now to the figures, FIG. 1 provides a wireless network with a Provider 140 and a plurality of discoverable hotspots according to one embodiment of the invention. Wireless network is illustrated as a computer network since a majority of WIFI networks are computer networks. As such, mobile devices 110 are illustrated and described as computer systems, although the devices may be any type of handheld or portable device. Further, other types of hybrid networks (e.g., computer network and wireless phone network) may also be enhanced with the features provided herein. Wireless network 100 includes multiple wireless access points 102a-c connected to a background distributed information network 130 that includes servers 135 of one or more network-access service provider as well as hotspot locating provider server (Provider) 140.

Each wireless access point 102a-c may include a radio frequency (RF) (or Bluetooth) transceiver (not specifically illustrated), front end server 125 using 802.11 or WLAN at the front end and backend server (wireless service provider's server 135) providing a high speed wired or wireless connection to the Internet 160. Front end server 125 executes a standard operating system (OS) (not shown) implementing communication protocols via an antenna for short-range wireless systems, typically Bluetooth or WLAN and an antenna for cellular networks, typically Global System Mobile (GSM) or CDMA. Server 125 includes a dedicated application for establishing a session with mobile device 110 and recognizing the MAC address of mobile device 110. Access point 102a-c is coupled to Internet 160 through backend server (135) via wireless link or a wired connection.

Access points 102a-c are geographically dispersed and may be utilized to provide mobile device 110 with wireless connections/access to wireless service providers 135 and Provider 140 whenever mobile device 110 is within a coverage area (hotspot) 104a-c (respectively corresponding to the area around similar lettered access point). Any number of access points may be available to mobile device 110 within a geographical area, and the present invention illustrates only a single access point within each of three geographic locations, provided for illustration only. These areas/locations may be adjacent to each other or geographically dispersed (e.g., different cities) and the illustration of three seemingly congruent areas is provided solely for illustration. In conventional application, the wireless access points 120a-c may be commercially available from several manufacturers or wireless service providers (135), which may require a user subscription. Other access points may be provided free of cost and/or without subscription (e.g., pre-pay or pay-as-you-use).

Figure 2A:
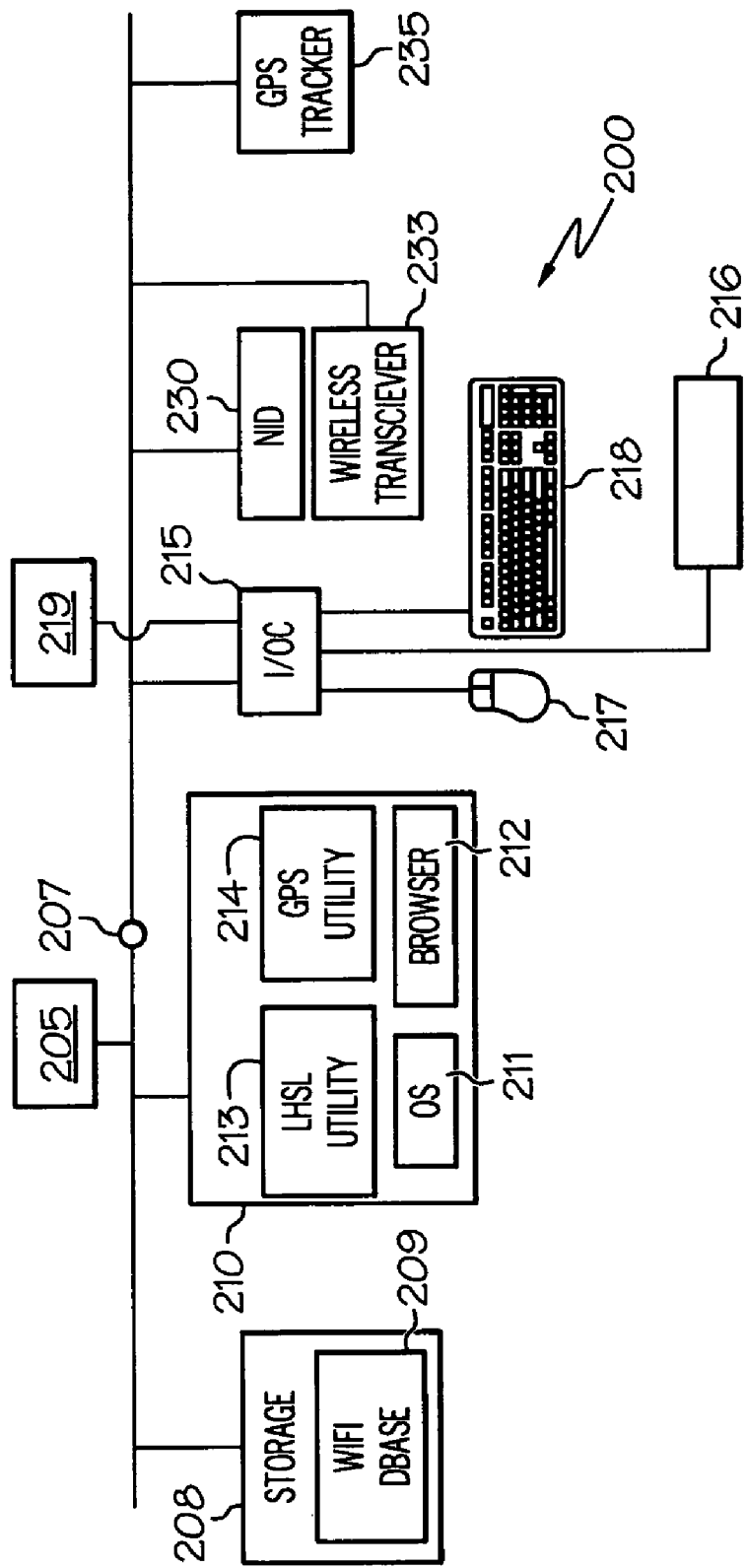
FIGS. 2A and 2B provide respective block diagram representations of internal components of a mobile device and a Provider according to embodiments of the present invention.
Figure 2B:
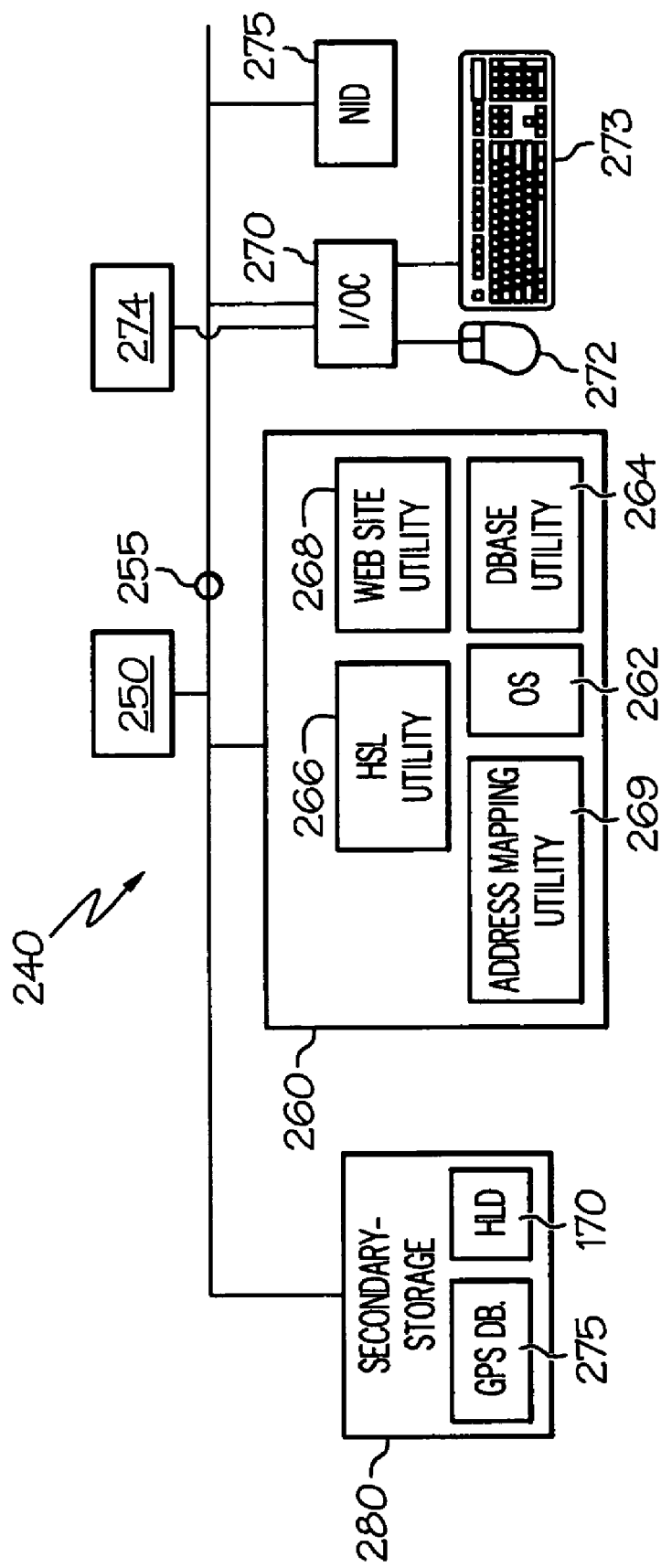

FIG. 2B illustrates an exemplary data processing system that may be utilized as Provider 140 of FIG. 1. For simplicity, data processing system will be referenced as Provider 140 since data processing system is illustrated having hardware and software components that together exhibit the functionality attributed/ascribed to the WIFI hotspot locator "Provider" described herein. Provider 140 comprises processor 250 coupled to memory 260, input/output (I/O) controller 270, and other/secondary storage 280 via system bus 255. I/O controller 270 provides the connectivity to and/or control of input/output devices, including mouse 272, keyboard 273 and display device 274.

Provider 140 also comprises network interface device (NID) 275 utilized to connect Provider 140 to another computer system and/or computer network (e.g., Internet 160, as illustrated by FIG. 1). NID 275 provides interconnectivity to the external network through a gateway or router, or similar device. NID 275 may be an Ethernet card or modem, for example, depending on the type of network (e.g., local area network (LAN) or wide are network (WAN)) to which Provider 140 is connected. In one embodiment, Provider 140 may also be extended to include a mechanism for supporting wireless access ports through which hotspot data is wirelessly transmitted to Provider 140 from a mobile device 110 of a mapper (via the process described with reference to FIG. 5 below.)

Provider 140 supports a hotspot locator database (HLD), which in one embodiment is maintained within secondary storage 280. In alternate embodiments, however, and as illustrated by FIG. 1, HLD 170 is actually a separate database, which may be directly accessed by Provider 140 or indirectly accessed Provider 140 via Internet 160 or other network (e.g., a LAN). Similarly, Provider 140 also maintains or has access to a GPS locator database 275, whereby Provider 140 is able to convert GPS coordinates into actual physical addresses and vice versa. As illustrated, GPS locator database 275 may be locally stored (on secondary storage 280, e.g., a hard drive or removable medium of Provider 140) or accessible via Internet 160 or other network.

Located within memory 260 and executed on processor 250 are a number of software components, including operating system (OS) 262 (e.g., Microsoft Windows®, a trademark of Microsoft Corp, or GNU®/Linux®, registered trademarks of the Free Software Foundation and The Linux Mark Institute, respectively) and a plurality of software applications, including database utility 264, hotspot location utility 266, and website utility 268. Provider 140 also comprises address mapping utility 269, which includes local maps and street addresses in a number of geographical locations in which hotspots may be found. In another embodiment, access to such services is provided by an online service such as MapQuest®. Processor 250 executes these (and other) application programs (e.g., network connectivity programs) as well as OS 262, which supports the application programs. According to the illustrative embodiment, when processor 250 executes OS 262 and one or more of the above utilities (application programs), the utility enables Provider 140 to complete a series of functional processes, including: providing/enabling receipt of general hotspot mapping data; HLD updating with performance metrics and other parameters; GPS-to-geographic location conversion; web site interfacing, including specific hotspot locating with user-entered metrics and parameters; and other features/functionality described below and illustrated by FIGS. 3-6.

Notably, while shown as separate utilities, each of the above utilities may be sub-components (subroutines) within a single WIFI locating utility. Also, existing conventional wireless services may be enhanced with hotspot mapping and locating functionality when the WIFI locating utility is installed on the service provider's server. Thus, Provider 140 may also be a service provider's server that provides general wireless access support to subscribers and/or free users.

FIG. 2A illustrates the primary hardware/software components of a computer notebook system 200, which is assumed to be mobile device 110 of FIG. 1 and described as such, hereinafter. Mobile device 110 is described as a notebook computer system because most of the functionality provided by mobile device 110 requires the standard hardware and software components of a notebook computer as well as downloadable software utility that enable the mobile device's user to access Provider 140 or operate as a stand-alone WIFI locating device, as described below.

Mobile device 110 is illustrated having several similar hardware components (illustrated with different reference numerals) as Provider 140, although typically smaller for increased portability. Additionally, mobile device 110 may comprise wireless transceiver for short-range wireless communication. Wireless transceiver may also be a GPS transceiver that enables mobile device 110 to connect long-range via a GPS system. Mobile device 110 also includes keyboard/keypad 218 and other selectable input devices, such as mouse 217 as well as output device, such as display 219.

According to the described embodiment, mobile device 110 may be utilized as: (1) a requesting device by which the user requests the hotspot location from Provider 140); (2) a mapping device by which the user detects hotspots and transmits WIFI hotspot information along with a GPS coordinate to Provider 140; (3) a stand-alone WIFI hotspot locating device by which mobile device 110 includes some or all of the locator service functionality (i.e., with or without requiring access to Provider 140, as described below in Section II; or (4) a device having two or more of the above functionalities. To enable these functionalities, mobile device 110 includes within memory 210 several software utilities, including OS 211, browser 212, Hotspot locator (HSL) utility 213, and GPS utility 214.

In one embodiment, the general hardware components of both mobile device 110 and Provider 140 are of conventional design. However, both may include additional and/or different components (not shown), such as fixed disk drives, removable disk drives, CD and/or DVD drives, audio components, modems, network interface components, and the like. It will therefore be appreciated that the systems described herein are merely illustrative and that variations and modifications are possible.

Further, the techniques/functionality for mapping, locating and tracking hotspots by GPS coordinates may also be implemented in a variety of differently-configured computer systems or mobile devices. Thus, while the invention is described as being implemented in Provider 140 that is in communication with mobile device 110, those skilled in the art appreciate that various different configurations of computer systems exist and that the features of the invention are applicable regardless of the actual configuration of these computer systems.

Specifically, with respect to mobile device 110, the invention is applicable to not only a notebook or laptop computer system but may also be implemented in a portable and/or hand held device such as a personal digital assistant (PDA), cell phone, or other hand-held devices, so long as the device is portable, supports wireless and GPS functionality and has the requisite utilities that may be executed by the internal processor to enable wireless connectivity to hotspots, mapping of hotspots and associated performance metrics, GPS coordinate tracking, and reporting of discovered hotspots, and the other functional features described herein.

According to the invention, hotspot location data may be collected in a variety of ways. The described embodiment involves a user (referred to herein as a "mapper") loading hotspot mapping software onto the user's GPS-enabled/equipped and WIFI (802.11/802.16)-enabled/equipped mobile device 110 (e.g., laptop or PDA). This embodiment recognizes the trend in wireless device technology to include within the wireless devices GPS and 802.11 hardware capabilities. As these technology improvements become standard on personal digital assistants (PDA's), cellular phones, and laptops, their use as mappers for Provider 140 becomes increasingly feasible. The hotspot mapping software triggers the mapping device to constantly scan for hotspots, identify the access ports and initiate corresponding Internet connectivity through these access ports. Information (such as operating parameters/performance metrics) regarding the discovered connections are gathered, and that information, along with the GPS coordinates of mobile device 110 are then transferred in real-time via an established connection to Provider 140.

In a second embodiment, the information is collected and stored in a local database of mobile device 110 and transmitted to Provider 140 at the user's discretion (e.g., when a link to Provider 140 is later established) or at some pre-set period. For those mappers who do not have a properly equipped mobile device, Provider's support personnel may issue the user a special portable device that is equipped with wireless (e.g., 802.11, 802.16) and GPS functionality.

Figure 5A:
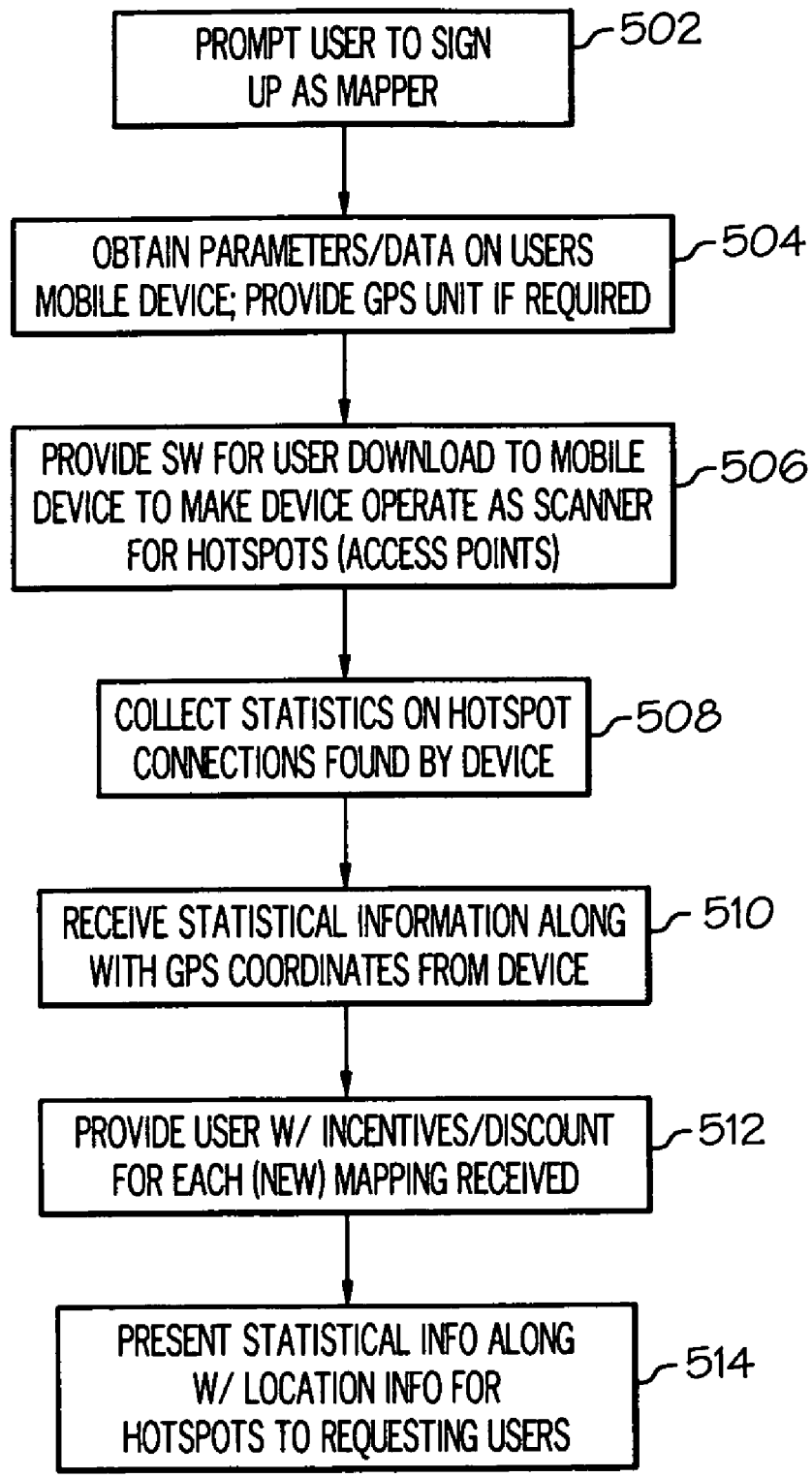
FIG. 5A is a flow chart of the processes undertaken by the Provider to register mappers to update an HLD according to one embodiment of the invention.
Figure 6A:
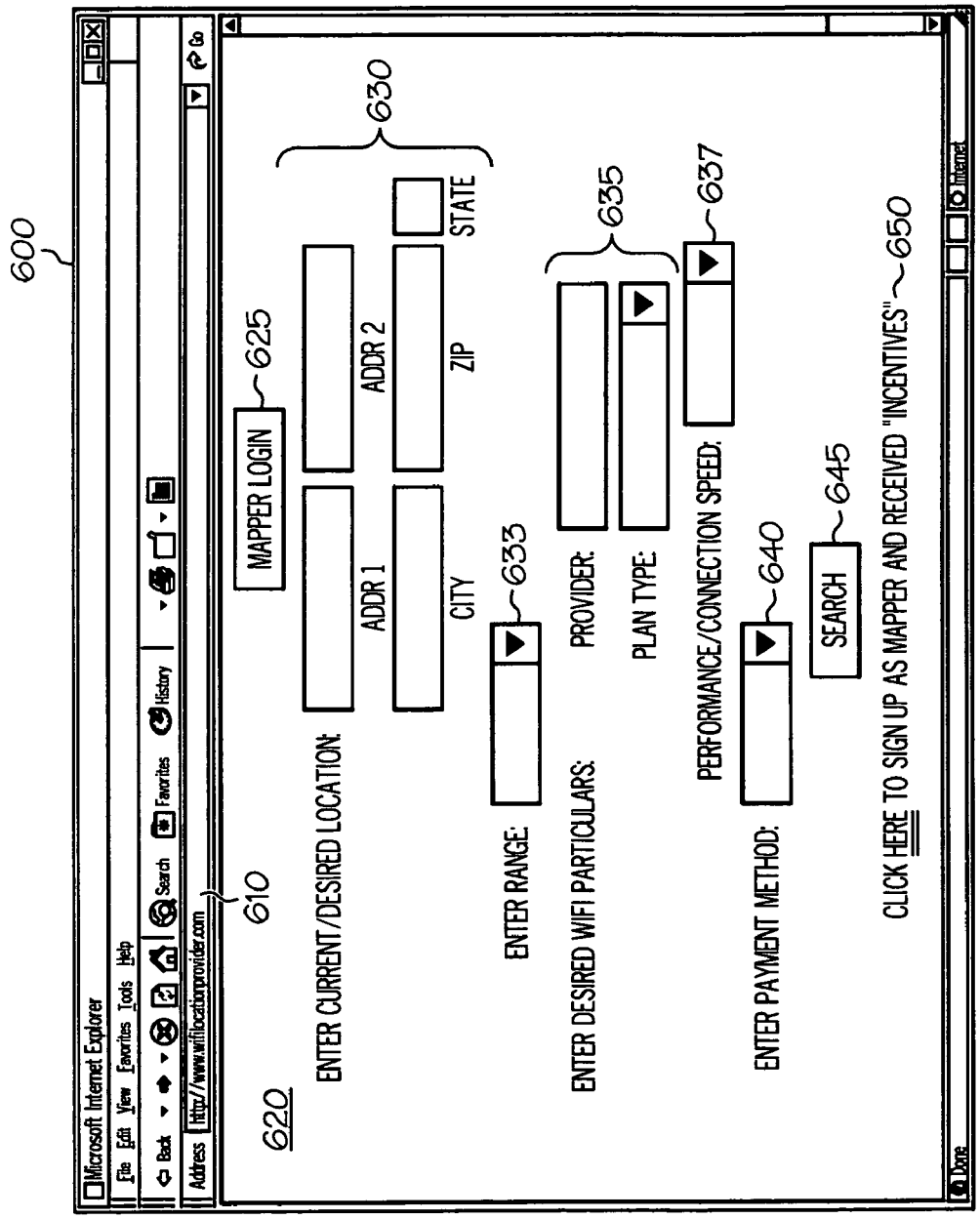
FIGS. 6A-6B depict graphical user interfaces (GUIs) of the Provider's website utilized by users to enter hotspot location requests/queries and sign up as mappers according to embodiments of the invention.
Figure 6B:
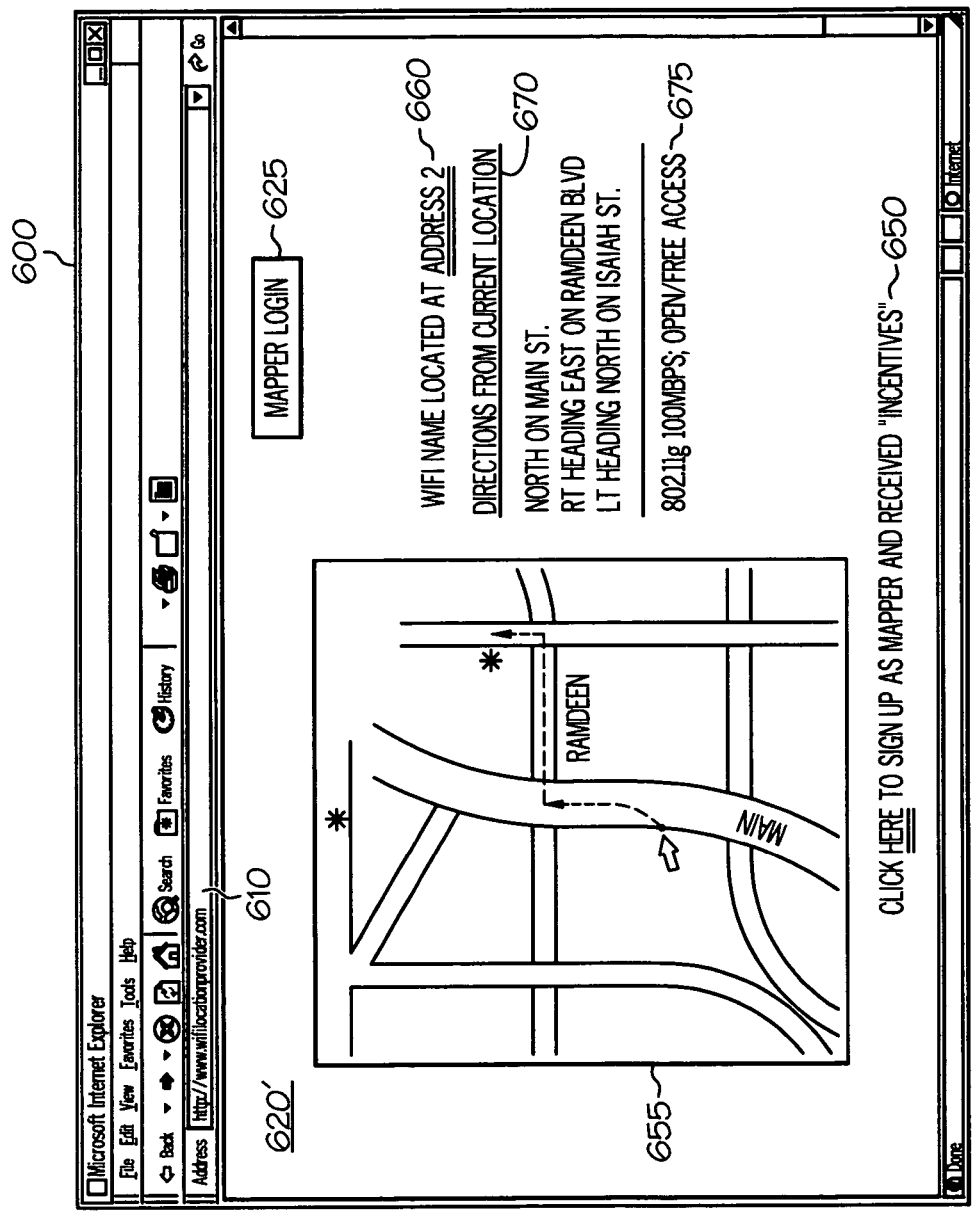

According to the described embodiment and as illustrated within graphical user interface (GUI) of FIGS. 6A-6B, users of the hotspot locating service are recruited as mappers. As shown by FIG. 5A, Provider 140 recruits a network of users with mobile devices capable of generating and transmitting HOTs. Recruiting may involve advertising/promoting some incentive to wireless users with GPS-enabled and 802.11-enabled wireless devices to act as mappers while they drive/move around. Users who agree to provide this mapping service (and perhaps those who provide a pre-established amount of HOT information) may then be awarded the advertised incentive(s), such as discounts on the querying services of Provider 140, coupons, and actual monetary payments.

The information received by Provider 140 is referred to herein as a hotspot operating/availability transmission (HOT) and includes WIFI identification (ID), performance metrics and operating status, and availability of the WIFI access at that location. Thus, the specific name of the hotspot may be provided, particularly when the hotspot is affiliated with a known service provider to whom users may subscribe. Alternatively, Provider 140 may generate a name for a hotspot not specifically identified or which has a shared, generic name similar to other hotspots in vicinity of the current hotspot.

Turning to FIG. 5A, and beginning at block 502 which depicts the Provider prompting users to sign up to be mappers. The prompt may be a strategically placed advertisement 650 on Provider's website interface 620 which is presented within web browser 600. Website 620 provides online access to the WIFI hotspot locating service available through Provider 140. Other websites (e.g., those promoting wireless products or wireless access) may also provide the advertisement to visitors of these sites. Assuming the user responds to the prompt within advertisement 650 to sign up as a mapper, Provider's website utility 268 generates a second web page (not shown) within which Provider 140 obtains from the user the configuration parameters of the user's mobile device and establishes a "mapper" account, as depicted at block 504.

In one embodiment, only users whose mobile devices support both wireless and GPS functionality are selected to become mappers. In one alternate embodiment, a user whose mobile device is not equipped with GPS capability is provided a separate GPS unit via the mail. Provider 140 then makes WIFI hotspot location mapping utility 213 available to the user, which the user downloads (from the website) to his mobile device to enable the device to operate as a hotspot mapper, as shown at block 506. Again, Provider 140 may mail the location utility on a disk to the user (e.g., for "manual" installation on a laptop) rather than direct download form the website. Once loaded on the user's mobile device, the utility self-installs and activates a background scanning function to locate hotspots and collect performance metrics for the various hotspots detected by mobile device 110, as indicated at block 508.

In one embodiment, the user's device would then report this information in real-time via Internet/wireless connectivity to Provider 140, which receives this information/data along with the associated GPS coordinates as a HOT, as indicated at block 510. Provider 140 maintains a hotspot lookup/locating database (HLD) that correlates GPS coordinates with WIFI hotspots via the process illustrated by FIG. 3A, which is described below. As shown at block 512, Provider 140 gives the advertised incentive to the user once the information is received from the user's mapping device. Finally, as indicated at block 514, Provider 140 then presents geographic location data and associated performance metrics of hotspots within geographic locations to requesting users via the process depicted by FIGS. 4A and 6B, which are described below.

Enabling local download/installation of the local version of HSL utility enables the invention to be implemented at the user-level as further described within Section II below. The user downloads or loads a user-level HSL utility (referred to below as LHSL) on the user's mobile device, and the utility executes and provides most of the functionality described herein within the user's mobile device. Provider 140 may thus provide individual user licenses to the user-level HSL utility and also periodically retrieve hotspot location information from the user's mobile device. In this way, once the utility is downloaded to the user's mobile device, the user device may operate completely independent of the Provider when locating a hotspot in a particular geographic location. However, an alternate embodiment entails Provider 140 maintaining the HLD such that each user has to access the HLD at Provider 140 to obtain the hotspot listing for the user's current location. The user's locally-stored HLD (referred to below as LHDL) may then be automatically uploaded in an exchange of HLD information whenever the user requests WIFI location information or whenever the user logs into Provider's website. Provider 140 thus receives current WIFI location information from thousands and potentially millions of WIFI users, who have simply enhanced their GPS-enabled mobile devices by loading the user-level HSL utility.

As previously mentioned, Provider 140 executes a hotspot location utility that maintains a database of available hotspots and their GPS coordinates. Compilation of the initial hotspots and associated coordinates within the database may be completed by an administrator (of Provider 140) or system developer. Beginning with this initial database, Provider 140 updates and maintains current hotspot information utilizing the process illustrated by FIG. 3A. The process commences at block 302 and proceeds to block 304 at which the Provider receives hotspot location and connection information from a mapping device within the WIFI hotspot.

Concurrently with receiving the HOT, Provider 140 also receives from mobile device 110 a GPS coordinate, as shown at block 306. Provider 140 then associates the GPS coordinate with the HOT, as indicated at block 308. In an alternate embodiment, the GPS coordinate is included within the HOT. Provider 140 then checks at block 310 whether the GPS coordinate and identified WIFI hotspot is a new WIFI hotspot (i.e., not one already stored within the HLD). When the WIFI hotspot is new, Provider 140 updates the HLD with an entry of this newly discovered/identified hotspot along with its associated GPS coordinate, as provided at block 312.

By correlating GPS coordinates with live connections of wireless devices, Provider 140 is able to build a substantially accurate and current database of hotspots that other users are able to access. Returning to decision block 310, if the WIFI hotspot is not new, Provider 140 updates the active status of the existing entry within the database and the corresponding performance metrics, as shown at block 314. Once the database has been updated, the process ends, as shown at block 316. FIG. 7 illustrates an exemplary HLD with an entry 700 that includes various ones of the multiple metrics that may be maintained by Provider 140 within the database.

In an alternate embodiment, rather than store the GPS coordinates, the coordinates are converted into their corresponding geographical locations (addresses) and then Provider 140 stores all HOTs with their corresponding addresses. Then, when a request is received that includes an address, the Provider looks up that address and maps around that address to determine hotspots stored within the database that are within proximity to that address. The user query may be made from a variety of devices, including laptops, PDA's, and cellular phones.

As utilized herein, the performance metrics refer to the bandwidth; availability (time of day, for example); minimum, maximum, and average latency; range from access point; wireless signal attenuation characteristics; and other similar type parameters that define the quality, strength, and usability of a hotspot. Other metrics may be "cost" associated, such as pre-pay, pay-as-you-use, free access, and/or subscription only access, for example. Additional metrics including date/time of discovery of hotspot (i.e., first mapping in HLD), date of last update, historical user ratings, and others may be included.

Further, some service providers (e.g., T-Mobile) present a sign-on web page to users who attempt to browse the web by connecting through the hotspot for the first time. In one embodiment of the invention, these web pages may also be detected and registered in the Provider's database, along with other statistical information, so that patrons of that service provider may also receive additional sign-on information about connection criteria for the particular hotspot(s) of that service provider.

Statistical information regarding the connections can be derived from the mobile device's wireless connection and other interactions within the hotspot. Such information may include the time periods in which the connection was active, the strength of the signal, the average connection bandwidth and latency, access ports that were closed off, and the overall availability and quality of the WIFI service at that location.

This information within the HOT is measured by the mapping device (wireless client). For example, a mapping device measures network latency over the connection by sending packets to other hosts on the Internet and measuring the round-trip time for the packet to return. The mapping device also compares round-trip times against those obtained over other hotspots in the region to gauge relative performance. Similar mapping methods may be implemented, although less reliably so, for bandwidth measurements, both peak and sustained. Each hotspot may provide one or more of the above metrics to the wireless device, which then forwards this information within the HOT to Provider 140. Operating characteristics and performance metrics (speed, strength, availability, bandwidth, congestion, protocol, etc.), as well as hotspot and service identification, cost, timing metrics and other information may be thus stored within an entry of the HLD.

The above described methods of updating the HLD involve a push of information from mapping device (110) to Provider 140. In an alternate embodiment, Provider 140 also supports a method by which information is pulled from mapping device 110. In this latter embodiment, Provider 140 monitors existing HOT entries within the database to ensure that the associated hotspot is still operational and/or to periodically update the stored performance metrics of the hotspot. Thus, in addition to receiving hotspot location information from wireless device 110, Provider 140 may also directly request information from the mapping devices 110 within certain geographic locations. That is, Provider 140 may automatically request mapping devices 110 within a particular geographic location initiate a sweep of a given geographic location associated with a particular GPS coordinate to determine whether previously recorded WIFI hotspots are still located in those locations and what performance metrics are presently associated with those hotspots.

The pull operation may be triggered by receipt of a HOT (by Provider 140) at a GPS coordinate that is in vicinity to a GPS coordinate of a previously stored HOT. In this way, a previously mapped WIFI hotspot that is no longer transmitting/broadcasting a signal in the particular location in which mobile device 110 of a mapper is present may be marked as non-functional/down (or potentially down). This status is reflected in the HLD and the entry may be tagged for deletion within a pre-set time unless a new HOT is received for that hotspot before expiration of the pre-set time.

Users who wish to utilize the hotspot locator service may do so by querying Provider 140. Different embodiments are provided by which a user may submit a query to locate a WIFI hotspot. One method involves submitting the query within a web browser via the Internet. In this embodiment, Provider 140 maintains a website via website utility 268. An example website interface for entering a hotspot query is illustrated by FIG. 6A. A user with access to the Internet opens browser 600 and enters the universal resource locator (URL) of Provider 140 in address field 610. Once submitted, the web browser returns Provider's web interface, of which website 620 is an example. As shown, browser 600 includes within address field 610 the Provider's URL, which is indicated as "WIFIlocatorprovider.com." Web site 620 includes a series of fields within which the user enters the query for a hotspot in a specific location. In addition to these query fields, website 620 also prominently displays advertisement prompt 620 for new mappers with the promise of some consideration/incentives, as described above. One embodiment of the process by which the user enters a query utilizing these fields of website 620 is illustrated by FIG. 4, which is now described.

The process begins at block 402 and proceeds to block 404 at which the user opens website 620 of Provider 140. Once website 620 opens, the user enters location criteria into address fields 630, which may include any combination of the street address and/or city, state, and zipcode of the location in which the user desires to find a hotspot, as shown at block 406. Also, in range field 633, the user may enter a range (distance) within which the user desires to locate the hotspot. For example, the user may desire to find the list of hotspots within a particular radius (e.g., three (3) miles) from the user-entered address in address field 630. Additionally, the user may also input a specific WIFI provider and/or type of plan (free, pay-per-use, subscription) desired in provider plan fields 635. Finally, the user may enter specific filters on performance metrics such as supported bandwidth, upload/download speeds, and others, in performance/connection field 637.

By using the above described web portal, Provider 140 may receive revenue through advertisements, subscriptions, and/or one-time query payments. Payment for utilization of the location service may be made by entry into payment field 640 of a credit card or other form of payment. Once all inputs have been made, the user selects search button 645 to initiate the search by Provider 140.

When Provider 140 receives the user selection of search button 645, Provider 140 retrieves the location/address entry and converts the address into a GPS coordinate at block 407. Then, as provided at block 408, Provider 140 utilizes the resulting GPS coordinate along with the other parameters entered by the user (i.e., preferences) to locate matching hotspot(s) within the HLD. In the illustrative embodiment, the query is parameterized according to certain user preferences (633, 635, 637). For example, the user may be willing to use a pay/subscription service, such as T-Mobile, if it means that the user will have to drive less distance or if the connection will be more reliable. Notably, if the user entered preferences, including additional search parameters or performance metrics, Provider 140 also screens those hotspots in the range of available hotspots to determine which ones satisfy the user's preferences (i.e., which identified hotspots have or exhibit the particular parameters/metrics requested).

A determination is made at block 409 whether any hotspot exists within the database that is within the geographic location and which also meets the additional user preferences. If such a hotspot is identified within the database, Provider 140 outputs the name of the hotspot, its address and driving/walking directions from the user-entered address, if a street address was provided, as indicated at block 410. Then the process ends at block 412.

However, when no hotspots are found within the database meeting these criteria, Provider 140 outputs a message that no hotspot was found (block 413) and returns the user to the search page (website 620) to change and/or update the search request, as shown at block 414. In one embodiment, when no matching hotspot is found during the initial search, the range is increased beyond the user's preference or beyond an initial default value. Thus for example, a second citywide search of the database may be completed if no hotspot is identified meeting a search criteria that limits the searchable area to one (1) mile from the entered physical address. In another embodiment, when the user preferences are not found within available hotspots, the user is provided with the available hotspots and a message indicating that the preferences can not be met.

An exemplary output of a located hotspot is illustrated by FIG. 6B, which depicts browser 600 with a different user interface of website 620. The illustrative output includes hotspot name and address 660, a street map 655 plotting the direction from current user location, and driving (or walking) directions 670. Notably, the output also includes performance metrics 675 of the provided hotspot(s), such as speed of connection, type/availability of service, and others. Those skilled in the art appreciate that any number of metrics (available within the database HLD) may be provided within the output and that the particular metrics illustrated are for example only and not meant to imply any limitations on the invention. As with FIG. 6A, website 120 displays advertisement 650 prompting the user to sign up as a mapper. User selection of this advertisement initiates the process provided by FIG. 5A, which is described above.

In the illustrative embodiment, a topographical view (street map) 655 of available hotspots surrounding the user entered address may also be generated. In the topographical view of a region, the hotspots can then be represented according to their overall quality, perhaps through color coding or other methods by which such information is displayed. Hotspots may also be displayed with a hidden text output of the QoS data, which is revealed when the user moves the cursor over the area.

Because of the manner in which hotspot location data is collected, as described above, hotspot coverage is up-to-date and reliable. The data is based on actual readings made by wireless networking hardware, rather than haphazard word-of-mouth reporting. In implementation, mail carriers and pizza delivery workers may be utilized as mappers. The company that provides the database hosting and querying service may then compensate companies or individuals for carrying the GPS/802.11 mapping device in vehicles as their employees travel around. Such compensation may be in form of free advertising on the website or some other monetary or non-monetary compensation. Further, in-vehicle computers such as provided by NeverLost™ may be utilized as mappers (or requesters) without requiring a user interface per se. The system would then detect he user's current location via the device's GPS coordinates without need for a web interface like that provided by FIG. 7.

II. User Device With Localized WIFI Location Functionality

The second implementation of the invention provides a GPS-enabled and WIFI-enabled mobile device (such as a laptop, smart phone, PDA, or in-vehicle computer) that includes locally-executed HSL (LHSL) utility (and associated locally-stored LHLD), which enables the device to independently generate and update the LHLD and to provide hotspot locating service utilizing the LHLD. With this implementation, a user is able to retrieve a list of up-to-date, location-based WIFI hotspots given a particular user request indicating the geographic location and the specific criteria desired for a hotspot request.

According to one embodiment, hotspot locating utility is a separate, add-on utility that enhances an existing user device and/or server. Hotspot locating utility may be obtained via off-the-shelf purchase (e.g., on a CD ROM) or downloaded as an add-on utility (from an online supplier website) or as an upgrade to existing server utility (from the server's support website), for example.

In one embodiment, the LHSL utility is executed in real-time with a user of the device entering a request (on the device) for a hotspot meeting certain location parameters and performance metrics. The LHSL utility ascertains based on the user provided location parameter (with the user's current GPS coordinates as a default location) which hotspots stored within the LHLD is within the given geographic location (meeting the specific performance metrics). The LHSL may further provide an indication of the hotspot among multiple found that is the closest hotspot and the best way for the user to get within range of that hotspot. Driving directions to the hotspot may also be presented to the user on his device, perhaps through a system such as OnStar.

The LHSL utility makes the device continually monitor the surrounding location(s) for WIFI hotspots, and updates the LHLD with current WIFI-hotspot data for the present location. Further, in one embodiment, the utility initiates automatic exchange(s) of updated WIFI-hotspot information with other devices (e.g., Provider 140 or another user device) so that both devices maintain updated HLDs. Connection to the other similar devices may be via peer-to-peer channels, while connection to Provider 140 maybe via the Internet. When connection is via the Internet, data transfer/exchange may be triggered whenever an Internet connection is detected).

FIG. 1 illustrates the various methods of communication from an example user device, mobile device 110. As shown, mobile device 110 may communicate with Provider 140 via wireless access point 120b or Internet 160. Mobile device 110 may also communicate with service provider 135 via access point 120b. Lastly, mobile device 110 may communicate with another mobile device 111 via a peer-to-peer network 180.

Mobile device 110 is depicted as a computer notebook, having similar hardware and computer software as notebook 200 of FIG. 2A. As described above, notebook 200 includes many standard hardware components found in conventional notebook computers, e.g., processor 205, memory 210, I/O devices (mouse/touchpad 217, keyboard 218, display 219, and I/O port 216 (e.g., USB port, a CD drive, etc.). Additional hardware components relevant for completing the specific functional features of the invention include wireless transceiver 233, GPS tracker 235, and storage 208 within which a local HLD is stored and updated. Notably, the LHSL utility 213 may be loaded on to notebook 200 via the I/O port device 216 (e.g., hard disk or CD ROM), which may also store the initial LHLD downloaded to storage 208 during installation of LHSL utility 213.

Figure 3A:
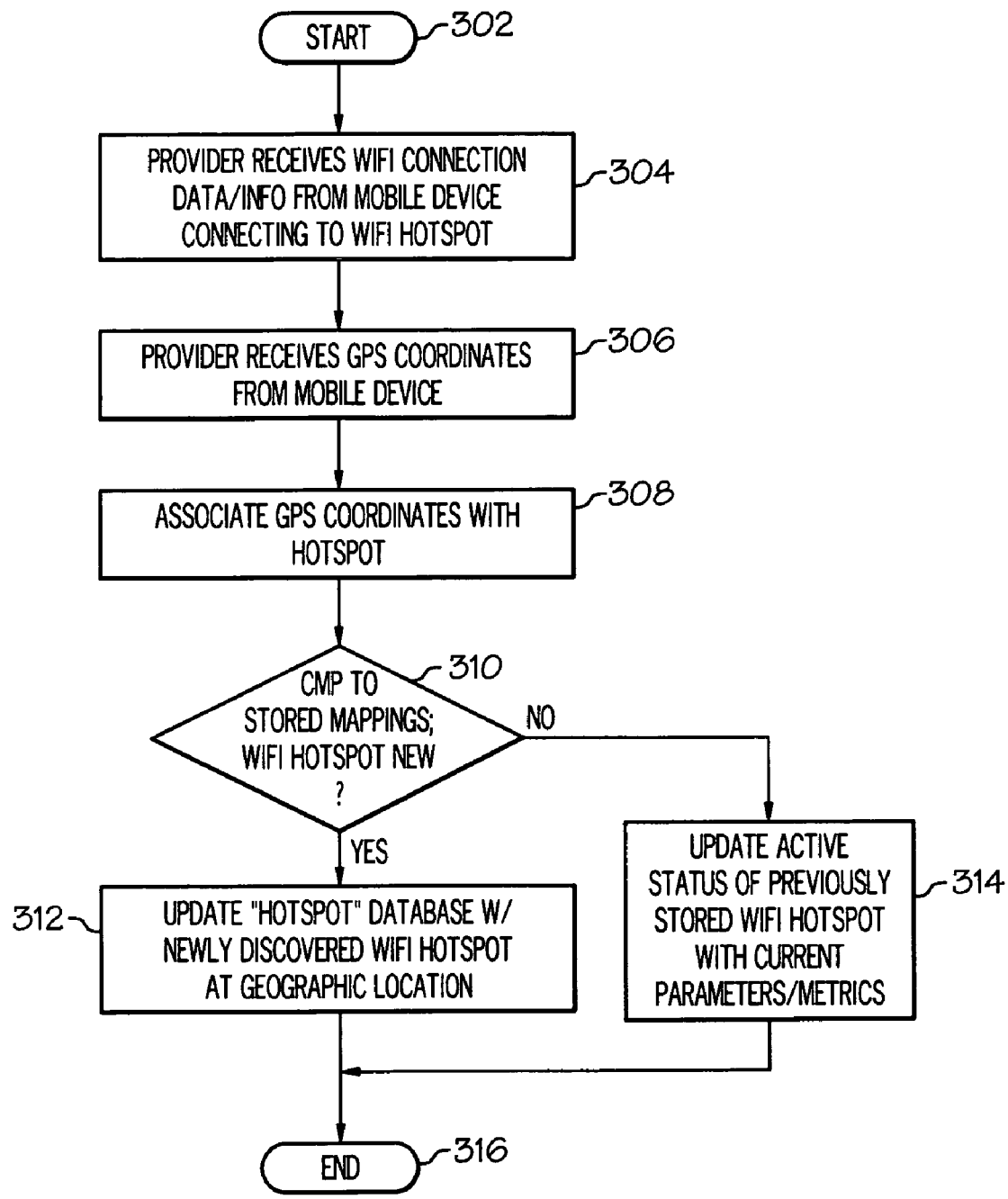
FIG. 3A is a flow chart of the processes undertaken by the Provider to update a hotspot location database (HLD) when receiving hotspot location data and performance metrics from a mobile device, according to one embodiment of the invention.
Figure 3B:
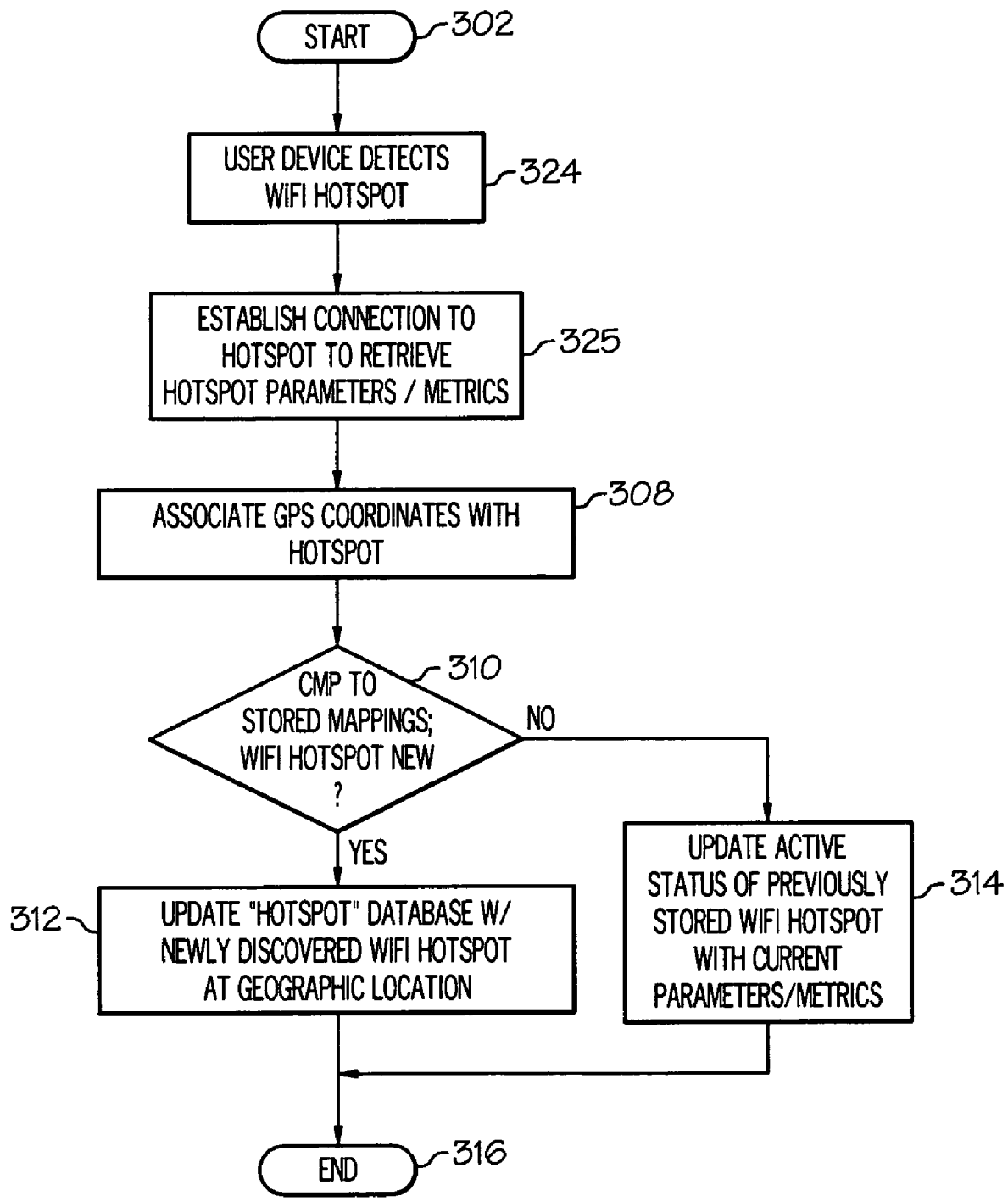
FIG. 3B is a flow of the processes undertaken by a user's GPS-enabled and WIFI enabled mapping device in detecting WIFI hotspots and updating a localized hotspot database with hotspot location and performance metrics according to one embodiment of the invention.

Referring now to FIG. 3B, which illustrates the process of updating of a user device's HLD 209 according to one embodiment. The process begins at block 302 and proceeds to block 324, which illustrates the user device detecting a WIFI hotspot. Whenever a hotspot is detected, the user device establishes a connection to the hotspot as shown at block 325. During the connection, the user device retrieves operating parameter data from the particular access point and front end server. This information along with the hotspot's name and service provider's information are then associated with the current GPS location of the user device according to the processes illustrated by blocks 308-316, which were previously described with reference to FIG. 3A.

Figure 4A:
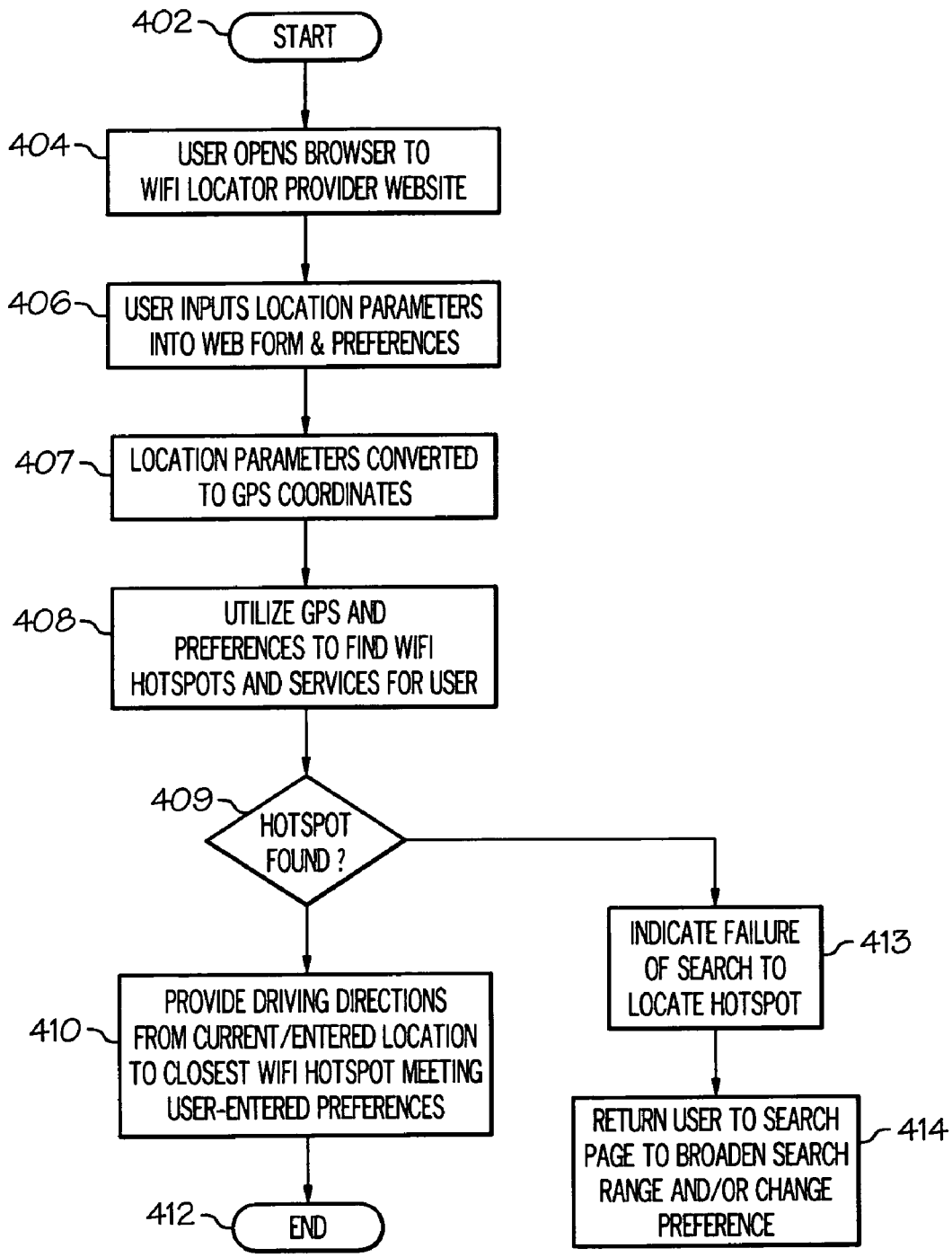
FIG. 4A is a flow chart of the processes undertaken within the Provider's website to receive and respond to user's requests for hotspot locating service according to one embodiment of the invention.
Figure 4B:
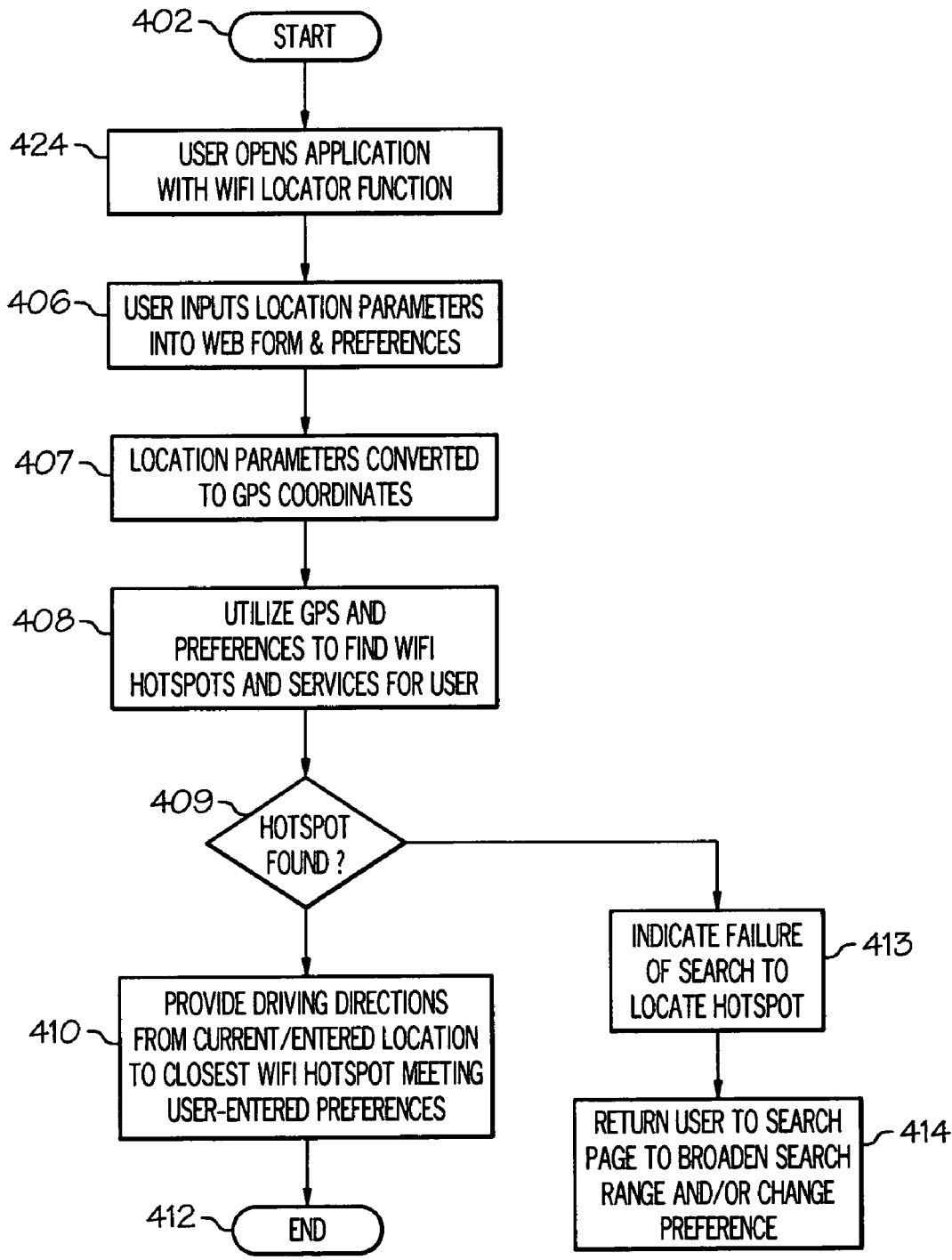
FIG. 4B is a flow chart of the processes undertaken at the user device to receive and respond to a user-entered request for hotspot locating service according to one embodiment of the invention.

FIG. 4B illustrates the process of handling a user request for hotspot location information. Receipt of this request may be via a local application graphical user interface (GUI) such as provided by FIG. 6A. Unlike the process of FIG. 4A, the user enters the request on an application GUI local to the user device and the results are determined via a local process utilizing the LHLD and presented to the user. That is, the user does not need to connect to an external device (e.g., Provider 140) to obtain the location information, as that information is stored within the user' devices storage 209. In one embodiment, the user pre-defines "filters" with minimum quality-of-service (QoS) expectations. When such filters are in place, the utility will simply not display hotspot locations for hotspots that do not satisfy the minimum QoS requirements.

Figure 5B:
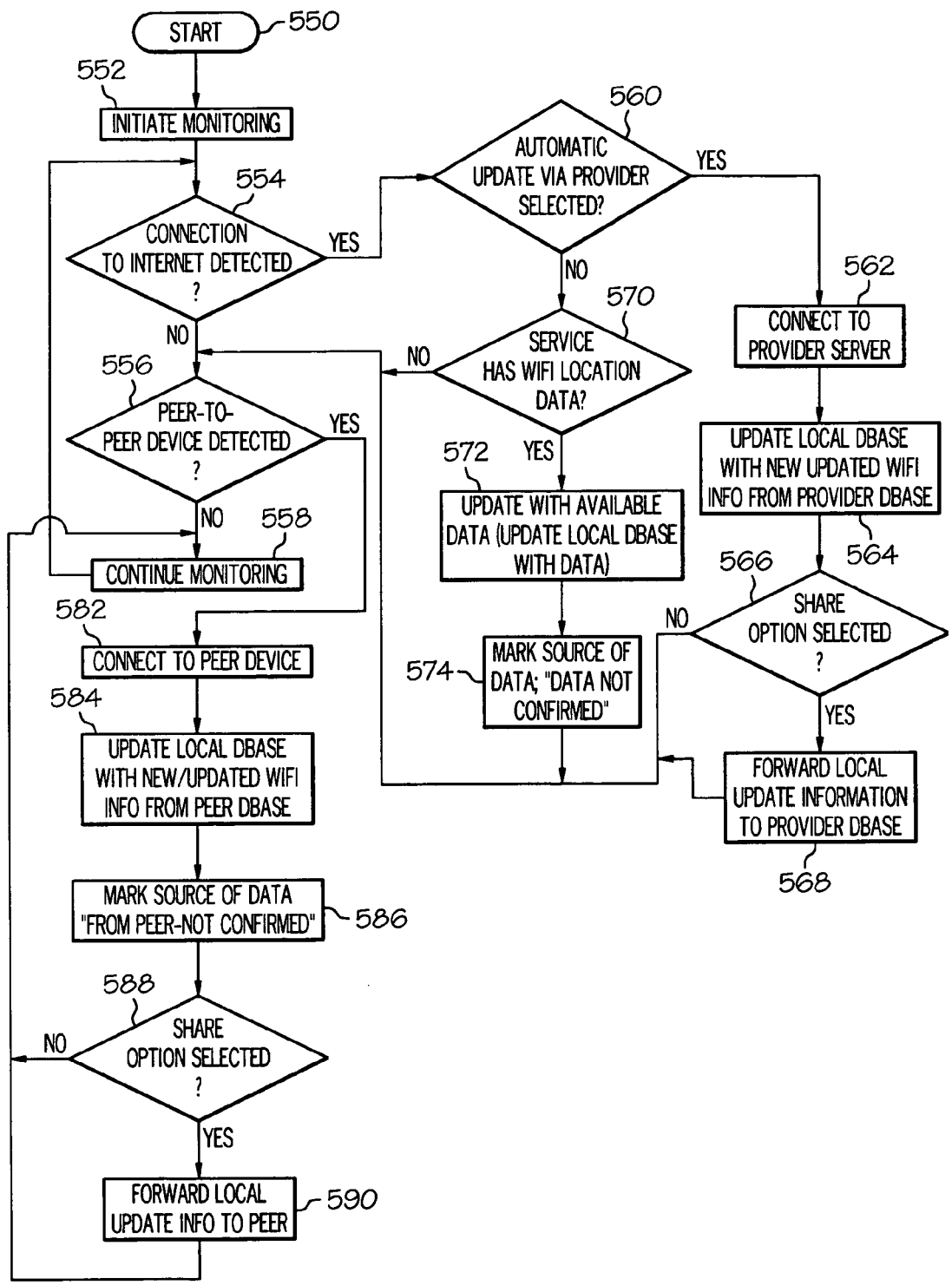
FIG. 5B is a flow chart of the processes undertaken at a user device in updating the localized hotspot location database according to one embodiment of the invention.
Figure 6C:
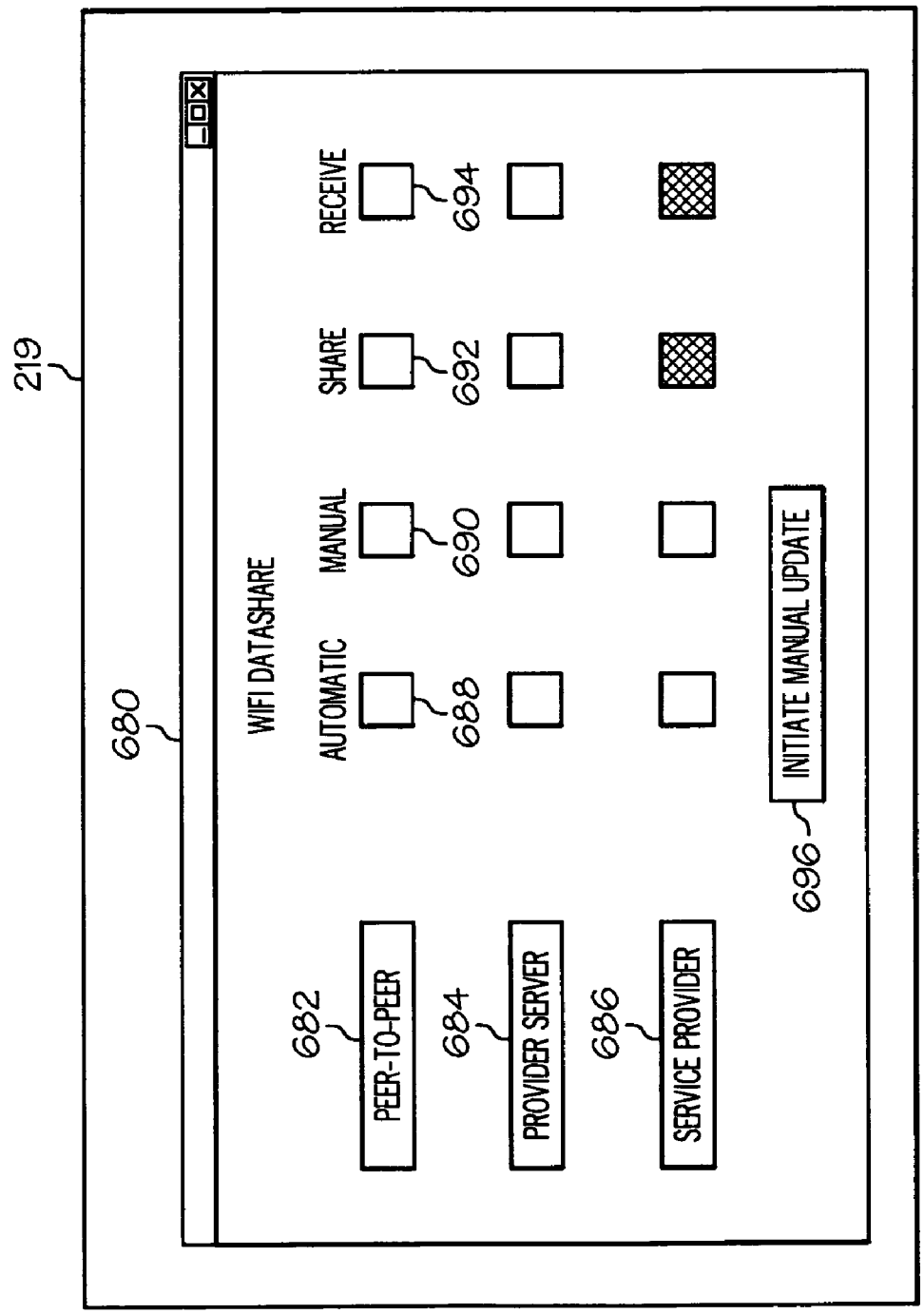
FIG. 6C illustrate an example GUI that is utilized to set the methods for updating the localized HLD on the user device according to one embodiment of the invention.

Updating the local HLD with current WIFI hotspot data may be completed via one or more of a series or processes. FIG. 5B illustrates how these processes may be implemented for a particular user device. FIG. 6C illustrates an example GUI, which may be utilized by a user to select which of the several processes are undertaken by the particular user device.

As illustrated by FIG. 6C, when initiated by user input/selection, the LHSL utility opens a HLD datashare GUI 680 within display 219. Within HLD datashare GUI 680 are a series of selectable options related to the manner in which the user desires the updates to the database to be conducted. Three options are provided, described as peer-to-peer 682, Provider HLD 684, and service providers 686. Selection boxes for each option include automatic update box 688 and manual update box 690. When automatic update is selected, the LHSL utility causes the user device to continuously scan the airwaves for detection of a peer device or for a hotspot to which the user device may connect to the Internet and ultimately the service provider and/or Provider 140. When the user has selected "manual update" for each option, no update occurs to the database until manual update button 696 is selected. Manual update button 696 is provided to initiate the manual update of the database by one (or more) of the selected option(s) for which manual update is checked by the user.

In addition to these two selections, an additional pair of selection boxes is made available for each option, namely, share data 692 and receive-only 294. When share data 692 is selected, the user device shares its local HLD entries with the other device to which the user device is connected. Date and time information is utilized to ensure that the most up-to-date version of a particular hotspot entry is saved to both databases when the databases contain a same hotspot entry detected at different times. Thus, within the user device's HLD, existing entries are updated if old/stale and new entries are added to the HLD. In one embodiment, timestamps are provided with each entry to indicate the date of the first detection of the hotspot and/or date of most recent update.

In contrast, when receive-only 294 is selected by the user, the utility executing on the user's device prevents the other device from retrieving/copying the data stored within the local HLD. This selection may be utilized in situations where the local data is proprietary and/to the data is valuable (financially or otherwise) and should not be provided to/exchanged with the other device. The invention contemplates an implementation in which a Provider compensates in some way for each new hotspot location, where particular locations (such as one that is highly requested by other users) may yield some compensation to the user providing that HOT to the Provider. For other reasons as well, enabling another device access to the HLD information may not be desired by the user.

Referring now to FIG. 5B, which illustrates the operation of the LHSL utility in providing the updates to the local database utilizing one or more of the above mentioned options. The process begins at block 550 and proceeds to block 552 at which the utility initiates monitoring functions for the user device. This process/embodiment assumes an automatic monitoring option has been selected rather than a user-directed/manual monitoring. This may involve triggering the hardware to detect wireless access points, detecting a peer device within communication range, and/or (soft) detecting connection of the user device to the Internet. A first determination is made at block 554 whether a connection to the Internet is detected. If no Internet connection is detected, a next determination is made at block 556 whether a peer device is detected. If no peer device is detected, the utility continues monitoring as shown at block 558.

If, however, a peer device is detected, the user device connects to the peer device, as indicted at block 582, and then the utility updates the local database with new/updated WIFI hotspot information from the peer device's database, as shown at block 584. For purposes of the invention, a peer device is assumed to be one which not only allows peer-to-peer communication but more importantly one which also maintains a LHLD. Data received from the peer device's LHLD are tagged as peer-data, as indicated at block 586.

A determination is then made at block 588 whether the share option (692) is selected, which allows sharing of information from the local database. If the share option (692) is selected, the information from the local database is forwarded to the peer device at block 590. In one embodiment, particular tags are assigned to information when the information is stored so that only true updates are passed during such communication. This reduces the amount of time required for the update operation to be completed when both HLDs maintain overlapping data.

Returning now to decision block 554, when an Internet connection is detected, a next determination is made at block 560 whether the automatic update via the Provider option is selected. When that option is selected, the utility connects (perhaps via the Internet) to Provider 140, as depicted at block 562 and then proceeds to update the LHLD with information from the Provider's HLD, as shown at block 564. At block 566, a determination is made whether the share option (692) is enabled. When the shared option (692) is enabled, the utility forwards the local HLD information to Provider 140 to update Provider's HLD, as indicated at block 568.

At decision block 560, when automatic update via the Provider is not selected (perhaps in the embodiments where there is no "Provider"), the utility checks at block 570 whether the WIFI service provider has hotspot location data. Assuming such data is available from the WIFI service provider, the utility proceeds to update the local HLD with this available data, as illustrated at block 572. Then, the updated data is tagged to indicate its source as being a service provider as shown at block 574.

Indicating the source of the data allows the utility to assign a level of confidence that may be provided when later providing that HLD entry in response to a user request. Locations that are detected by the user device are more likely to be provided with higher level of confidence, while those received from a secondary source (such as service provider) are given much lower level of confidence.

As introduced above, one embodiment provides a hybrid of the above two implementations (Sections I and II), by which Provider 140 enables download of LHSL utility (213) to implement a user-level hotpot location service, substantially independent of Provider 140. A user downloads or loads a user-version (or user-level) HSL utility on the user's mobile device, and the utility executes and provides most of the functionality described herein within the user's mobile device. Provider 140 may thus provide individual user licenses to the user-version hotspot locating utility 213 and may also periodically exchange hotspot location information from the user's device. In this way, the user's mobile device may be substantially independent of Provider 140 when performing updates to its local HLD within a particular geographic location.

However, an alternate embodiment entails only Provider 140 maintaining the HLD for non-local hotspots such that each user has to access the Provider's HLD to obtain the current "local" hotspot listing when the user enters a different geographic location (other than his/her home location) with his device. The user's current LHLD may then be automatically uploaded in an exchange for current HLD information when the user requests hotspot location information for the new location or when the user logs into Provider's website from the new location. In one embodiment, the exchange of HLD data is automatically triggered when the Provider's HSL utility recognizes the user as being in a different location (GOS coordinate) from the user's home location.

As a final matter, it is important that while an illustrative embodiment of the present invention has been, and will continue to be, described in the context of a fully functional computer system with installed management software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A mobile user device comprising:
    a processor;
    local storage accessible to the processor and processor operations;
    a system interconnect;
    a global positioning system (GPS) receiver coupled to the system interconnect that records a current GPS location of the mobile device;
    a wireless transceiver coupled to the system interconnect and which is capable of detecting hotspots, supporting wireless connection to the hotspots, and receiving operating characteristics and performance metrics of the hotspots; and
    a locally-executed hotspot locating (LHSL) utility executing on the processor and which comprises program code that when executed by the processor performs the functions of:
        responsive to a detection of a wireless hotspot by the wireless transceiver, identifying a current GPS coordinate of the computer device;
        linking the current GPS coordinate with an identifier (ID) of the detected wireless hotspot; and
        automatically updating a locally-stored hotspot location database (LHLD) stored on the local storage with an entry corresponding to the detected hotspot and linked GPS coordinate;
    automatically initiating a connection to a wireless access point associated with the detected hotspot, wherein said code that provides the function of updating the LHLD comprises code for: storing the operating parameters and performance metrics within the entry for the hotspot; and providing said operating parameters and performance metrics to a user when said user later requests a listing of hotspots that that results in an output the entry; and
    dynamically retrieving information about the hotspot during the connection, said information comprising operating characteristics and performance metrics of the hotspot and associated service from among: name/identification (ID) of the hotspot; name of the hotspot service provider/vendor; cost associated with accessing the hotspot; availability of the hotspot, including general total uptime and periods of availability for access; bandwidth of the wireless link to the hotspot; estimated bandwidth of the link from the hotspot to the background network; average time to establish a connection to the hotspot, guaranteed minimum download speed and minimum upload speed; maximum, minimum and average latency added by the hotspot link; accessibility range of the hotspot; wireless signal attenuation characteristics exhibited by the hotspot; overall quality of service (QoS) of the hotspot, determined utilizing parameters that define the quality, strength, and usability of the hotspot; overall historical and current user rating of the hotspot,
    wherein said code that provides the function of dynamically retrieving comprises code for: accessing the hotspot; transmitting one or more test packets to a backend network connected to an access device of the hotspot, said test packets causing a return packet to be generated by one or more hosts within the backend network and transmitted back to the device; and determining operating characteristics and performance metrics of the hotspot and associated service based on the connection to the hotspot and the transmission and return of the test packets;

measuring the round-trip time for the test packets to return to determine network latency over the hotspot connection;

mapping bandwidth measurements, both peak and sustained, for the hotspot;

storing said network latency and bandwidth measurements within the hotspot entry;

comparing round-trip times of the detected hotspot against other round-trip times obtained for other hotspots in the geographical area to gauge relative performance; and providing said latency, said relative performance and said bandwidth to a user when said user later requests a listing of hotspots that results in an output of the entry;

when the detected hotspot is previously identified within an existing entry of the LHLD:
  updating only the operating parameters and performance metrics of the existing entry whereby duplicate entries are avoided and the existing entry contains updated and current information; and
  storing within the existing entry a time of a last update, wherein each entry is assigned a entry creation time and a most current update time that is adjusted as updates to the existing entry occur;

receiving a request for one or more hotspots within a particular geographic location;

determining which acceptable entries of the multiple entries within the HLD have a geographic location in proximity to the particular geographic location;

identifying those entries having proximate geographical locations as acceptable entries;

providing an output of the acceptable entries to the user;

when said request includes user-preferences for operating characteristics and performance metrics associated with the acceptable hotspot: comparing the user preferred operating characteristics and performance metrics to the stored operating characteristics and performance metrics for each of the entries deemed acceptable based on their proximity to the specific geographical location; and presenting for output only those entries that are both proximate to the specific geographic location and exhibit similar operating characteristics and performance metrics as the user-preferences, wherein when no entry that is proximate to the specific geographic location also exhibits similar operating characteristics and performance metrics, said code comprises code for displaying a result that indicates that no entries proximate to the specific geographic location exhibits the user-preferences;

displaying a user interface within which a user may enter said request, said user interface being displayed locally on the device, wherein said receiving of the request occurs when the user enters and submits the request within the user interface, and wherein said providing displays said output via a graphical display associated with said user interface, and wherein for each returned acceptable entry, the output comprises one or more of: hotspot and service identification information; usage terms for the hotspot; system requirements for accessing the hotspot; known performance metrics a and operating characteristics of the hotspot; street address; driving directions from an origination point entered by the user within the request; and, when graphics output is support by the user interface, a map of the location of the hotspot;

a mechanism for generating and transmitting HOTs (hotspot operability transmissions) including corresponding GPS locations to a remote Provider;

a mechanism for establishing communication with a second device; and wherein the wireless receiver receives operating characteristics and performance metrics of the hotspots when wireless connectivity is established by the LHSL utility, wherein said LHSL utility further comprises code that when executed performs the functions of:
  when the second device includes stored hotspot location data:
    establishing a connection to communicate with the second device;
    ascertaining that the hotspot location data on the second device is stored in a supported format for sharing;
    updating the device's LHLD with hotspot location data from the second device that is more recent than the hotspot data currently stored within the device's LHLD; and
    tagging the hotspot location data received from the second device as originating from the second device;
  when the second device is a peer device, dynamically establishing said connection as a peer-to-peer connection; and
  when a share option is turned on within the device, automatically sharing the device's LHLD with the second device.

* * * * *

UNITED STATES PATENT AND TRADEMARK OFFICE
CERTIFICATE OF CORRECTION

PATENT NO. : 7,466,986 B2
APPLICATION NO. : 11/335894
DATED : December 16, 2008
INVENTOR(S) : Michael Austin Halcrow and Dustin Kirkland It is certified that error appears in the above-identified patent and that said Letters Patent is hereby corrected as shown below:

In the Specifications:

Column 1, line 10 delete "11/355,444" and insert --11/335,444--.

Signed and Sealed this
Twentieth Day of August, 2013

Teresa Stanek Rea
*Acting Director of the United States Patent and Trademark Office*